United States Patent [19]

Buckley

[11] 4,258,475
[45] Mar. 31, 1981

[54] GOLFER'S SIGHTING DEVICE

[76] Inventor: Robert D. Buckley, 15 Morrison Rd., Wakefield, Mass. 01881

[21] Appl. No.: 103,707

[22] Filed: Dec. 14, 1979

Related U.S. Application Data

[63] Continuation-in-part of Ser. No. 911,369, Jun. 1, 1978, abandoned.

[51] Int. Cl.³ .......................... G01C 1/00; A63B 69/36
[52] U.S. Cl. .................................... 33/283; 33/377; 33/370; 273/32 H
[58] Field of Search ................. 33/283, 377, 228, 370; 273/32 R, 32 B, 32 H

[56] References Cited

U.S. PATENT DOCUMENTS

| 396,883 | 1/1889 | Lawrence | 33/283 |
| 1,948,612 | 2/1934 | Bouchard | 33/370 X |
| 2,584,917 | 2/1952 | Powell | 33/377 |
| 2,991,273 | 7/1961 | Hechelhammer et al. | 273/DIG. 1 |
| 3,293,755 | 12/1966 | Cronwell | 273/32 H X |
| 3,522,657 | 8/1970 | Metrulis | 33/342 |
| 3,535,792 | 10/1970 | Douglas | 33/283 |
| 3,871,104 | 3/1975 | Underhill | 33/377 X |
| 4,005,870 | 2/1977 | Grace et al. | 273/32 H X |

FOREIGN PATENT DOCUMENTS 8052 of 1891 United Kingdom ...................... 33/377

Primary Examiner—George J. Marlo
Attorney, Agent, or Firm—Morse, Altman, Oates & Dacey

[57] ABSTRACT

A sighting device for enhancing a golfer's putting accuracy comprises an elongated vertical sight and a liquid level, which are provided by a compact hand-held, semitransparent or translucent casing with particular indicia and contained liquid. After the golfer moves to a position at which he views the ball and the cup along their shortest interjacent path, he views the position of the cup with respect to the ball in reference to the sight and plumbs the sight in reference to the level. A correct indication of how the ball will break thereby is provided.

8 Claims, 13 Drawing Figures

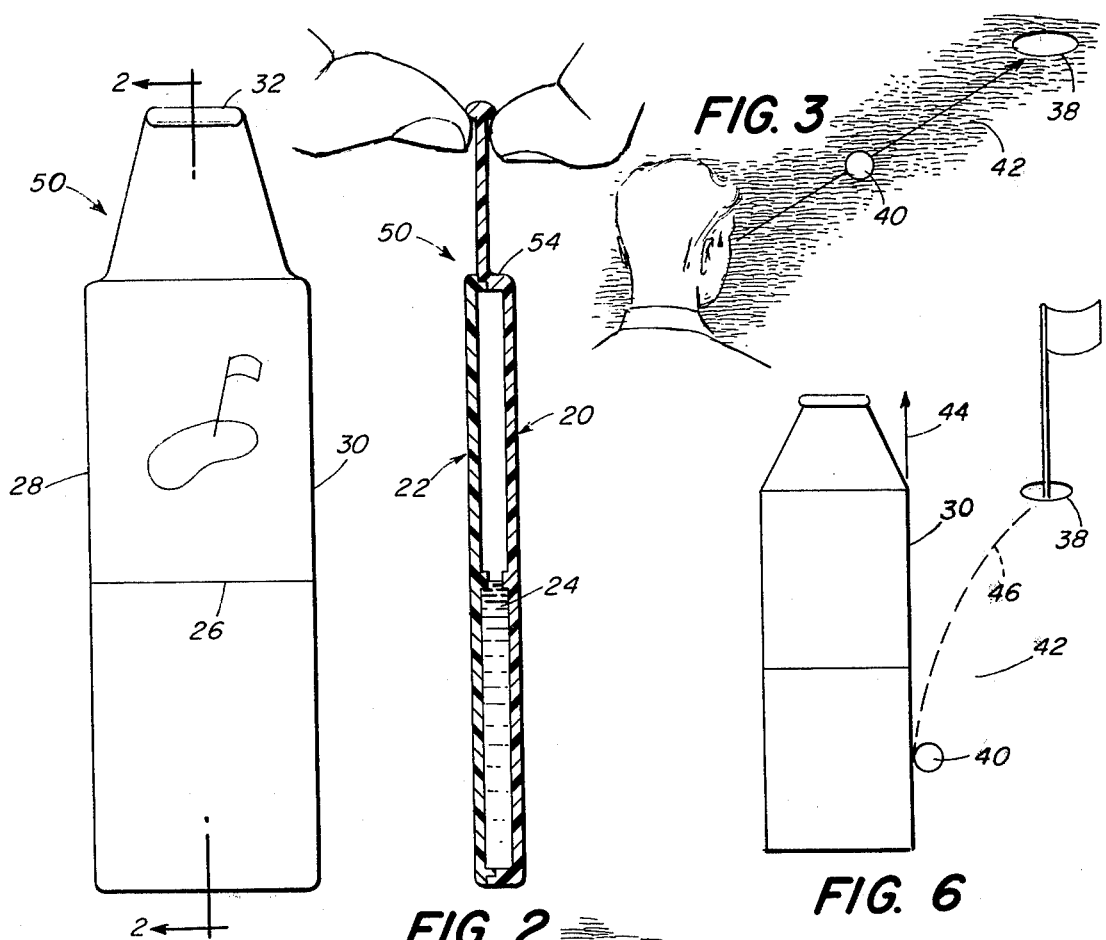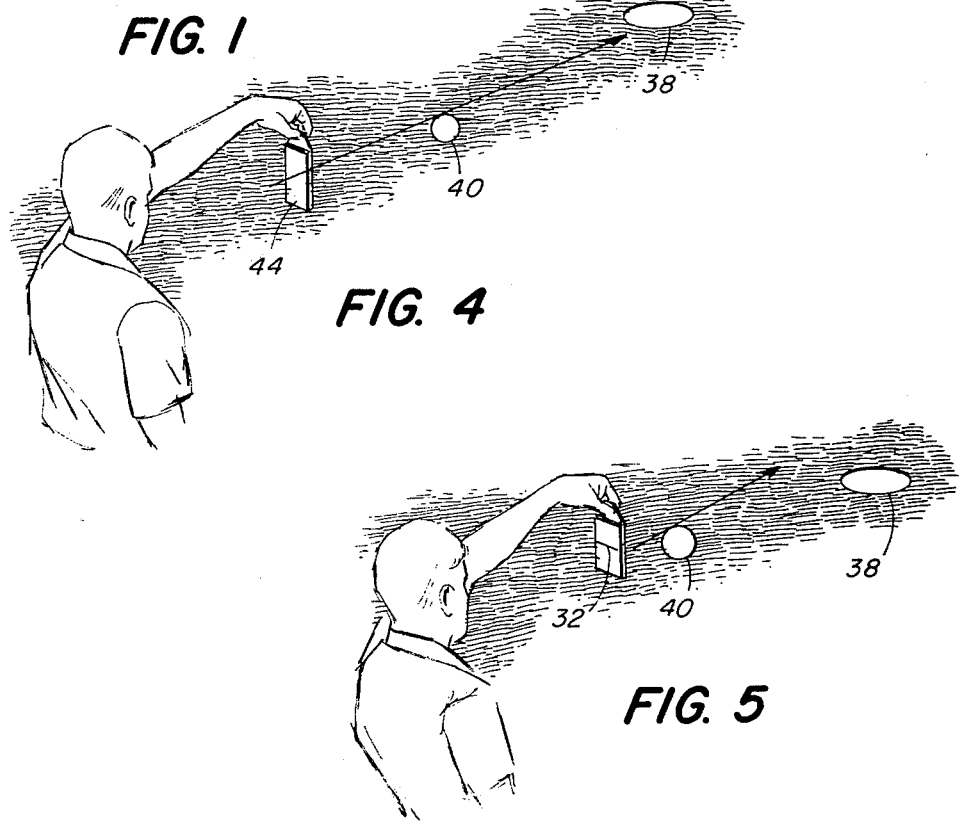

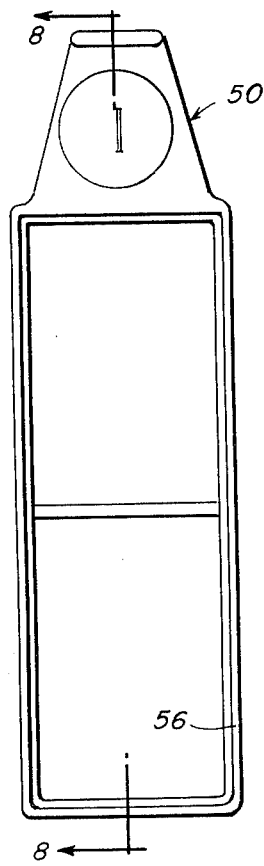
FIG. 7
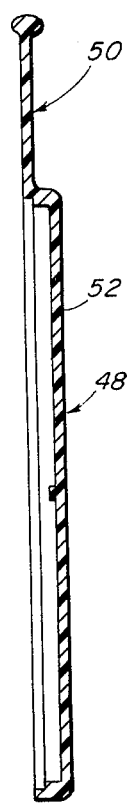
FIG. 8
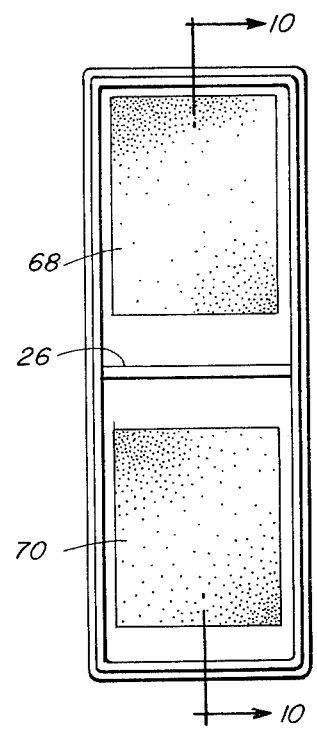
FIG. 9
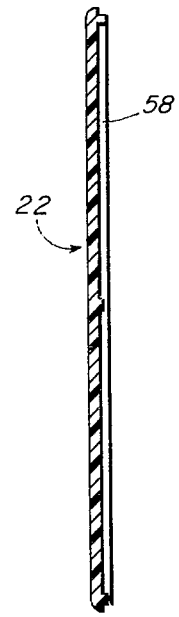
FIG. 10
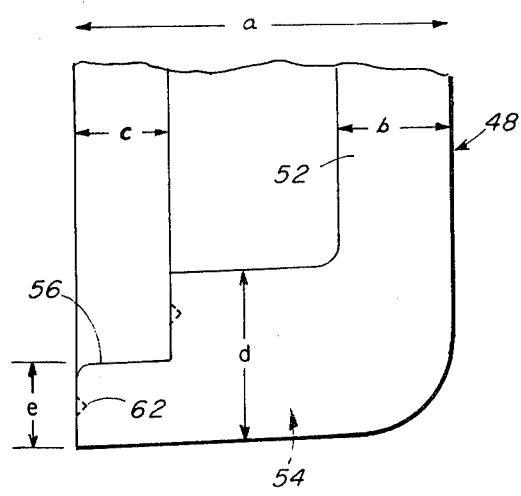
FIG. 11
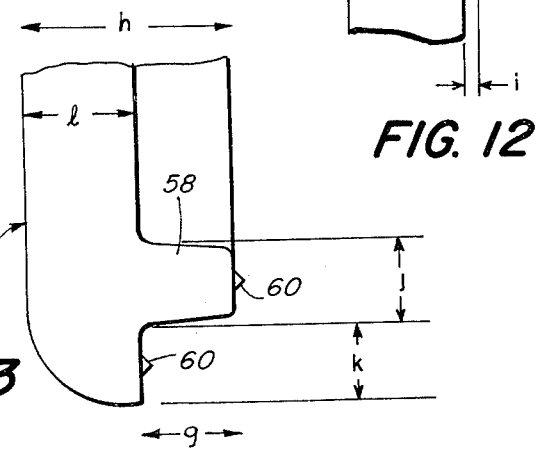
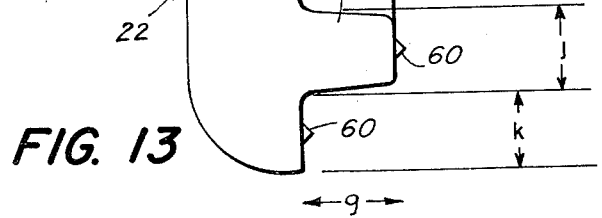
FIG. 13
FIG. 12

4,258,475

GOLFER'S SIGHTING DEVICE

RELATED APPLICATION

The present application is a continuation-in-part of patent application Ser. No. 911,369, filed June 1, 1978, for Golfer's Sighting device, in the name of the applicant herein, now abandoned.

BACKGROUND OF THE INVENTION

1. Field of the Invention

The present invention relates to golfing accessories and, more particularly, to a sighting device for enhancing a golfer's putting accuracy.

2. The Prior Art

Golfers always have had difficulties in assessing the effect of irregular and sloping terrain on balls to be putted. Obviously, in the case of a transverse slope between the ball and the cup, the golfer cannot hit the ball directly toward the cup, but rather must hit the ball up the slope at an angle with respect to the shortest path between the ball and the cup. Accordingly, there long has been a need for a simple but efficacious device for assisting a golfer in estimating how a putted ball will break.

BRIEF DESCRIPTION OF THE INVENTION

The primary object of the present invention is to enable a golfer to enhance his putting accuracy by use of an elongated vertical sight and a plumbed liquid level, which are provided by a finger-held, light-transmitting casing with particular indicia and contained liquid. The casing is in the form of a thin, sealed vial of elongated parallelepiped shape with relatively adjacent opposed faces and relatively remote opposed edges. The upper surface of a liquid within the vial and a transverse indicating lineation on one or both of the opposed faces operate as a liquid level to indicate when the vial is vertical. When vertical, one or both edges of the vial constitute sights, one of which, when viewed as being tangent to the ball, indicates a target direction along which the ball should be hit in order to curve toward the cup. Extending upwardly from the casing is a thin pivot portion, which, when depending loosely from between the thumb and the index fingers, facilitates maintenance of the plumb condition.

Other objects of the present invention will in part be obvious and will in part appear hereinafter.

The invention accordingly comprises the product, together with its parts and their interrelationships, which are exemplified by the present disclosure, the scope of which will be indicated in the appended claims.

BRIEF DESCRIPTION OF THE DRAWINGS

For a fuller understanding of the nature and objects of the present invention, reference is made to the following specification, which is to be taken in connection with the accompanying drawings, wherein:

FIG. 1 is a front view of a device embodying the present invention;

FIG. 2 is a cross-section of the device of FIG. 1, taken substantially along the line 2—2 of FIG. 1;

FIG. 3 illustrates the first step in using the device of FIG. 1;

FIG. 4 illustrates the second step in using the device of FIG. 1;

FIG. 5 illustrates the third step in using the device of FIG. 1;

FIG. 6 illustrates certain principles of use of the device of FIG. 1;

FIG. 7 is a front view of the rear part of the casing of FIGS. 1 and 2;

FIG. 8 is a cross-sectional view of the part of FIG. 7, taken substantially along the line 8—8 of FIG. 7;

FIG. 9 is a front view of the forward part of the device of FIGS. 1 and 2;

FIG. 10 is a cross-sectional view of the part of FIG. 9 taken substantially along the line 10—10 of FIG. 9;

FIG. 11 is a fragmentary, enlarged view of the lower portion of the cross-section of FIG. 8;

FIG. 12 is a fragmentary, enlarged view of a medial portion of the cross-section of FIG. 10; and FIG. 13 is a fragmentary, enlarged view of the lower extremity of the cross-section of FIG. 10.

DETAILED DESCRIPTION OF THE PREFERRED EMBODIMENTS

The golfer's sighting device of FIGS. 1 and 2 is in the form of a hermetically sealed vial of flat parallelepiped shape, which contains a levelling fluid and which incorporates plumblines, sighting lines, and a fulcrum region. The vial is shown as having a rear part 20 and a front part 22, both composed of a light transmitting plastic, preferably a polycarbonate such as that sold by General Electric under the trademark "LEXAN". The continuing edges of these panels are sealed ultrasonically to provide a hermetic chamber, within which is liquid 24. For operational purposes, there are provided: a horizontal visual line 26 on front part 22, which is aligned with the free surface of liquid 24 when the device is plumb; sighting edges 28, 30 that are vertical when the device is plumb; and a pivot configuration 32, which rests loosely upon the inverted thumb and forefinger so that the depending device hangs substantially freely.

The functions of horizontal visual line 26, vertical sighting lines 28, 30, and pivot configuration 32 now will be described in reference to FIGS. 3, 4, 5, and 6 and in relation to a cup 38, a golf ball 40 to be putted, and interposed terrain 42 to be transversed. First, as shown in FIG. 3, the golfer moves to a position at which he views the ball and the cup along their shortest interjacent path, taking into consideration the slope and irregularity of interposed terrain 42. This shortest interjacent path may or may not be the same as the line-of-sight path between the ball and the cup. Next, as shown in FIG. 4, the golfer positions an edge 28 or 30 of the vial so that the ball is viewed as being tangent to one of these edges. The tangentional relation of ball 40 and edge 28 or 30 is shown in FIG. 6. As shown in FIGS. 4 and 5, the sighting device hangs freely from the thumb and finger of the golfer, which act as a fulcrum for pivot configuration 32. The arrangement is such that observation of horizontal visual line 26, with respect to the upper surface of liquid 24, provides the golfer with information by which he can guage how freely his thumb and forefinger are permitting the device to hang. In other words, if indicia 26 and water surface 24 indicate that the device is not plumb, then the golfer can relax his thumb and forefinger slightly in order to permit freer pivotal movement about the fulcrum provided by his thumb and forefinger. Relationships among vertical edge 30, ball 40, and cup 38 are shown in FIG. 6 when terrain 42 is irregular and sloping. Since the golfer now has the correct feel, by which his thumb and forefinger permit the device to hang freely in plumb condition, he can concentrate on the direction 44 of edge 30 as an indicator of the direction of the putt in order to achieve desired path 46 to cup 38.

As shown in FIGS. 7, 8, and 11, back part 20 includes a shallow dish portion 48 and an upwardly extending pivot portion 50. The base 52 of dish portion 48 constitutes the rear wall of the device and the peripheral walls 54 bounding base 52 constitute the top, bottom, and side walls of the device. As shown, the forward edges of walls 54 are shouldered at 56.

As shown in FIGS. 9 and 10, front part 22 is a generally a flat plate, which constitutes the front wall of the device. Extending as a rim that is adjacent to the outer edges of front part 22 is a ridge 58, which is adapted to seat within the notch of shoulder 56 in peripheral wall 54 of back portion 48. Projecting rearwardly from the outer edge of front part 22 and from the rearward surface of ridge 58 are pilot projections 60. Perpendularly extending with respect to the vertical edges of the device is a shoulder 64, which constitutes horizontal indicating line 26. In one form, shoulder 64 is coated with a black lacquer 66. As shown in FIG. 13, ridge 58 is tapered so that its outer and inner walls converge slightly toward each other in order to ensure tolerance for the precise fit of the front and back parts when they are in assembled condition. Preferably the upper and lower portions of front part 22 are provided with translucent regions 68, 70, which focus attention on the space therebetween, within which indicator 26 is visible.

Preferably the vertical length of the device of the present invention ranges between 3 and 5 inches and the horizontal width ranges between ¾ and 1½ inches. In reference to FIGS. 11, 12, and 13, the dimensions of the front and back parts of the illustrated device are given as follows in inches:

a—0.025
b—0.075
c—0.062
d—0.110
e—0.055
f—0.075
g—0.062
h—0.137
i—0.010
j—0.052
k—0.053
l—0.075

OPERATION

In operation, the illustrated sighting device is sufficiently compact and thin to be kept inconspicuously in the golfer's shirt pocket. Just before preparing for a putt, the golfer removes the sighting device from his pocket and rests pivot configuration 32 on the portions of his thumb and forefinger that he has formed into a gap for this purpose. As shown, pivot configuration 32 is in the form of a bead at the upper edge of an extension from back part 20. This extension, for simplicity, is integral with the dish portion of back part 20. It will be understood that, in an alternative embodiment of the illustrated device, the vertical extension carrying bead 32 projects from front part 22. The golfer now is in position to control the gap between his thumb and forefinger while observing the relation between indicator 26 and the surface of liquid 24. When this relationship is such that plumb orientation of edges 28, 30 has been achieved, the golfer can sight along either of the edges in order to determine the optimal direction of the putt.

Since certain changes may be made in the foregoing disclosure without departing from the scope of the present invention, it is intended that all matter shown in the accompanying drawings and the foregoing specification be interpreted in an illustrative and not in a limiting sense.

What is claimed is:

1. A sighting device for enhancing a golfer's putting accuracy said sighting device comprising:
    (a) a hermetically sealed vial;
    (b) a liquid contained within said vial;
    (c) said vial being of substantially flat, elongated configuration and having a pair of opposed substantially flat face panels;
    (d) at least a first indicating lineation extending transversely on at least one of said face panels and at least a second indicating lineation extending longitudinally along an edge of at least one of said face panels;
    (e) a pivot portion at the upper end of said device, said pivot portion including oppositely directed protrusions adapted to rest on portions of the thumb and forefinger inverted and forming a gap therebetween;
    (f) said liquid being aligned with said first indicating lineation when said second indicating lineation is plumb;
    (g) said vial being composed of a light transmitting polymer so that said fluid is visible therethrough;
    (h) the longitudinal dimension of each of said face panels being at least twice as great as the width of said each of said face panels;
    (i) the width of said each of said face panels being no greater than 2 inches;
    (j) the distance between said face panels being no greater than ⅜ inch;
    (k) said face panels being composed of polymeric panels, ranging generally in thickness from 0.050 to 0.090 inch.

2. The sighting device of claim 1 wherein said vial has a thin chamber and said first lineation is approximately mid-way between the top and the bottom of said chamber.

3. The sighting device of claim 1 wherein said first indicating lineation is disposed between an upper masking region and a lower masking region on said front face panel.

4. The sighting device of claim 1 wherein said pivot portion is integral with one of said face panels.

5. The sighting device of claim 1, wherein one of said face panels is the base of a shallow dish part, said shallow dish part having an integral extension at the upper extremity of which is said pivot configuration.

6. A sighting device for enhancing a golfer's putting accuracy, said sighting device comprising:
    (a) a first shallow part and a second shallow part defining therebetween a hermetic chamber;
    (b) a liquid within said hermetic chamber;
    (c) said hermetic chamber having a generally rectangular profile;
    (d) said first part defining a shallow dish having a flat base portion and peripheral walls;
    (e) said second part defining a generally flat base and a peripheral ridge adjacent to the edges thereof;
    (f) said wall of said first part and said ridge of second part defining shouldered portions that are fused to each other;

(g) at least one of said parts providing an extension defining a transverse pivot portion including a bead that extends outwardly in opposite directions from said extension.

7. The sighting device of claim 6 wherein said pivot portion is integral with one of said face panels.

8. The sighting device of claim 6 wherein one of said face panels is the base of a shallow dish part, said shallow dish part having an intergral extension at the upper extremity of which is said pivot configuration.

* * * * *